Feb. 16, 1965  R. NEUSCHOTZ  3,169,258
METHOD OF FORMING SELF-LOCKING THREADED ELEMENTS
Filed July 16, 1962
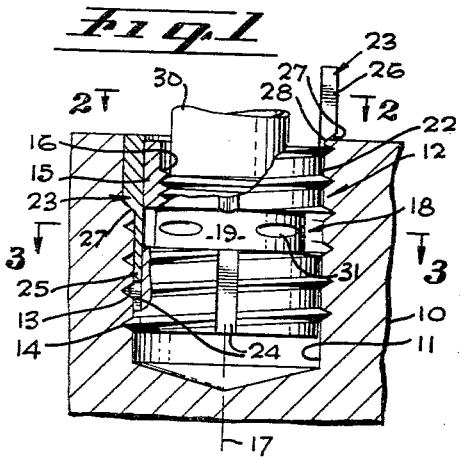
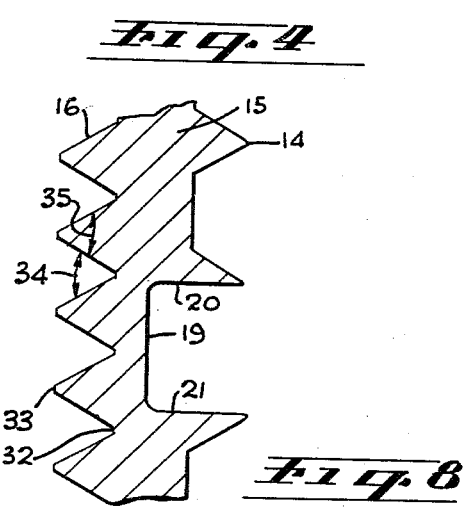
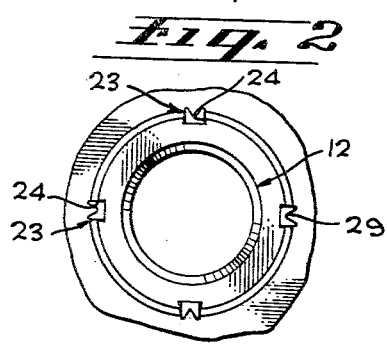
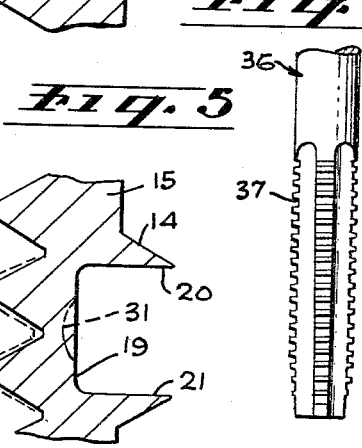
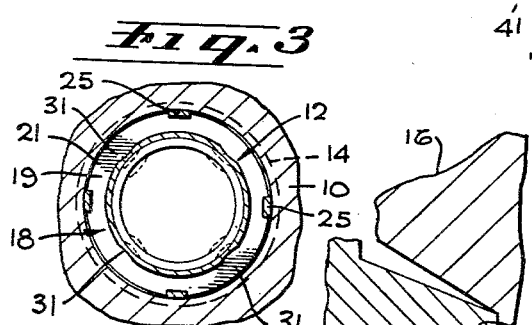
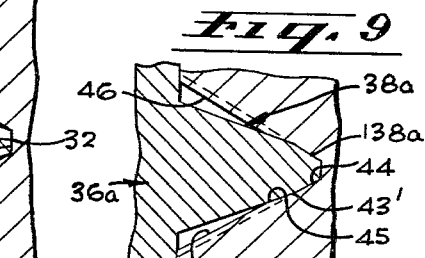
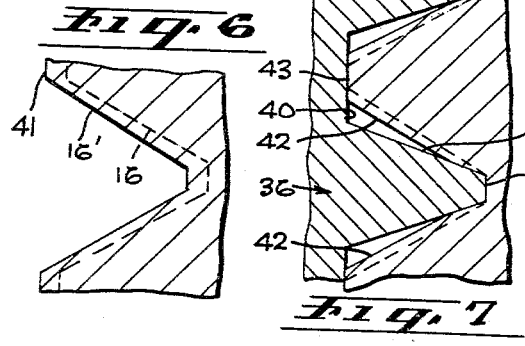
INVENTOR.
ROBERT NEUSCHOTZ
BY William P. Green
ATTORNEY United States Patent Office 3,169,258
Patented Feb. 16, 1965

3,169,258
METHOD OF FORMING SELF-LOCKING
THREADED ELEMENTS
Robert Neuschotz, 1162 Angelo Drive,
Beverly Hills, Calif.
Filed July 16, 1962, Ser. No. 209,947
7 Claims. (Cl. 10—86)

This invention relates to an improved method for forming a self-locking threaded element, that is, an element adapted to engage a coacting threaded element in a relation automatically locking the two parts against unwanted unscrewing relative movement. Certain structural features of an element formed by the method of the present invention are covered in my copending application Serial No. 210,080, entitled "Structure of Self-Locking Threaded Elements," filed of even date herewith.

The threaded elements with which the present invention is concerned are of the general type in which a self-locking action is attained by locally deforming the threads of an element in a manner causing at least a portion of those threads to have a tight interference type fit with a coacting member, so that the tightness of this fit produces the desired locking action. For instance, when the threaded element to be rendered self-locking is a threaded insert having both internal and external threads, the generally tubular wall of the insert may be locally deformed inwardly a short distance, to slightly reduce the diameter of the internal threads at the deformed locations, so that those threads will engage a coacting stud sufficiently tightly to lock it against unwanted removal from the insert.

Self-locking elements of the above discussed general type have been devised in the past, and have proven very effective for achieving the discussed purpose of locking one threaded element against unwanted detachment from another. However, these prior devices have had a very decided disadvantage in use. Specifically, when a locally deformed part of this type has had another threaded element connected to it, the tight interengagement between the threads has frequently had the effect of damaging the threads of one or both of the engaged parts in a manner such that they can not be used again after having once been screwed together. When screwed together, the tightly interfitting threads may form burrs on one another, or may actually fuse together, so that they can not subsequently be detached when desired, or if detached, can not again be screwed together with any effective self-locking action.

The general object of the present invention is to provide a method for forming self-locking threads of the above discussed type in a manner acting to assure against damage to the self-locking threads in use, so that two parts having the desired self-locking action may be screwed together many times without loss of the self-locking effect. Each time that the elements are screwed together, they have a sufficiently tight interengagement to frictionally lock the parts against separation by forces normally encountered in use, and yet if a predetermined greater removal torque is applied to the parts, they can be separated, and when subsequently screwed back together will still have substantially the same self-locking action which was present on the first use.

In studying prior deformed thread self-locking devices of the above discussed general type, I have learned that the damage to the frictionally interfitting threads in use occurs at the peaks of the threads, that is, at their major and minor diameter portions, rather than radially between those locations. This is true because the threads are of relatively small cross-section at their peaks, and therefore are easily damaged at those locations. Radially between the major and minor diameter locations, the threads have greater strength, and are able to withstand the forces and temperatures encountered without damaging those portions of the threads.

In order to provide a self-locking thread which will avoid this disadvantage, the present method so forms the self-locking portions of the threads that they will not fit tightly at at least one of the major or minor diameter locations, and preferably both of those locations, but instead will have their primary tight fitting locking engagement at the strongest portions of the threads, radially between their major and minor diameters. To achieve this result, I follow a method which includes the steps of first locally deforming certain portions of the threads, and then relieving one or both of the major and minor diameter portions of the threads, preferably by cutting them away by a tapping tool or the like. As will appear, where the self-locking threads are internal threads within an insert, this relieving of the major and minor diameter portions may be accomplished by means of a tap having cutting projections adapted to extend into and cut away the major diameter portions of the deformed threads, and also shaped to cut away the minor diameter peaks of the threads, without cutting away the intermediate stronger portions of the threads.

The above and other features and objects of the invention will be better understood from the following detailed description of the typical embodiments illustrated in the accompanying drawing, in which:

FIG. 1 is a partially sectional view representing a threaded insert having self-locking threads formed by the present method, and shown positioned within a carrier part;

FIG. 2 is a plan view taken on line 2—2 of FIG. 1;

FIG. 3 is a cross-section taken on line 3—3 of FIG. 1;

FIG. 4 is a greatly enlarged fragmentary axial section through a portion of the side wall of the FIG. 1 insert, with the side wall being shown as it appears prior to the localized deformation thereof in forming the self-locking threads;

FIG. 5 is a view similar to FIG. 4, but showing in broken lines the condition of the insert sidewall after being deformed;

FIG. 6 is a further enlarged fragmentary section taken in the plane of FIG. 5, showing in full lines the deformed condition of the threads;

FIG. 7 is a view similar to FIG. 6, but showing the manner in which the deformed threads are cut away by a tap after deformation;

FIG. 8 is a view representing the tap which may be utilized in FIG. 7; and

FIG. 9 is a view similar to FIG. 7, but showing a tap having a somewhat different cutting cross-section.

With reference first to FIG. 1, I have shown at 10 a carrier part containing a bore 11 into which a threaded insert 12 is connected. Bore 11 has internal threads 13 which are engageable with external threads 14 on the insert, so that the insert may be screwed into its illustrated position of reception within the carrier part.

Insert 12 has a generally tubular body 15 which may be formed of metal, such as steel, with external threads 14 being formed about the outside of the body, and internal threads 16 being formed within the body, all centered about an axis 17. At a location midway between its axially inner and outer ends, tubular body 15 of the insert has an annular external groove 18, which may be defined by a cylindrical wall 19 (FIG. 4) centered about axis 17, and two parallel annular walls 20 and 21 disposed transversely of axis 17. Groove 18 extends into the material of the insert body radially inwardly beyond the minor diameter portions 22 of threads 14, to interrupt those threads at the location of the groove, and provided a relatively thin walled portion of the insert at the groove.

The insert is locked in the FIG. 1 installed position within carrier part 10 by means of one or more (preferably four) locking keys 23, which initially are frictionally held in the position of the right hand one of these keys in FIG. 1, relative to insert body 15, and are adapted to be driven axially relative to the body to lock the insert in the carrier part. Each key 23 is received within an axially extending groove 24 formed in the outer surface of the insert (and interrupted at the location of groove 18). The axial grooves 24 have the dove-tail cross-section configuration illustrated in FIG. 2, and the keys are of similar cross-section, and guided by the dove-tail shape of the grooves for only axial movement relative to insert body 15. Each key has an axially inner portion 25 which is radially thin enough to be received entirely within the minor diameter of threads 14, so that portion 25 will not interfere with screwing of the insert into the carrier part. The axially outer portion 26 of each key is thicker radially, and projects beyond the minor diameter of threads 14, and preferably approximately as far as the major diameter of those threads. Each key is initially so positioned that its large portion 26 projects axially outwardly to the position of the right hand key in FIG. 1, with the thin portion 25 being received within the corresponding groove 24, and tightly frictionally retained by that groove in a manner such that the keys will not move axially within the grooves in normal handling. When the insert is screwed into position, the shoulders 27 formed at the inner ends of enlarged portions 26 of the keys act to engage the outermost edge 28 of bore 11, to limit the extent to which the insert may be screwed into bore 11, and thus accurately locate the insert therein. When the insert has reached this position, keys 23 are driven axially to the position of the left hand key in FIG. 1, to cut into the material of carrier part 10, and thereby effectively lock the insert against unscrewing rotation. To increase the effectiveness of the keying action, the enlarged portion 23 of each key may contain a groove 29 (FIG. 2) dividing the enlarged portion into two cutting edges for cutting into and deforming the material of part 10.

After the insert has been installed in part 10 in the above discussed manner, a coacting externally threaded stud or bolt (30 in FIG. 1) may be screwed into engagement with internal threads 16. The present invention is primarily concerned with the manner in which insert 12 is designed to have a self-locking action with this stud or bolt. Such a self-locking action is provided by locally deformimng the side wall of the insert body at the location of groove 18, typically at four evenly circularly spaced locations as represented at 31 in FIG. 1. FIGS. 4 through 7 represent various steps followed in thus deforming and subsequently retapping the internal threads within the insert.

Initially, the insert is formed to the condition of FIG. 4, in which the major diameter portions 32 and minor diameter portions 33 of threads 16 are of uniform diameter along the entire axial extent of these threads. The threads 16 may have the conventional cross-section of "standard" 60° threads, that is, with the angles 34 and 35 both being 60°. The threads may be formed by any conventional thread forming process, such as by rotating and axially advancing within the insert a thread cutting tool, for example a conventional tap having 60° cutting edges.

After the threads have been formed to the initial condition of FIG. 4, the four locally deformed areas 31 are formed within groove 18, as by striking radially inward blows against surface 19 at the desired locations by a hammer or other impact tool. Thus, the side wall is deformed inwardly to the broken line position of FIG. 5, so that the internal threads 16 are deformed inwardly to a reduced diameter condition represented approximately in broken lines at 16′ in FIG. 5. FIG. 6 shows in full lines this deformed condition of the threads which are just opposite each of the locations 31, with the initial condition of the threads, prior to deformation, being represented in broken lines in FIG. 6. The broken lines of FIG. 6 may also be considered as representing the outer surface of the threads formed on stud 30 which is to be screwed into the insert.

After the threads 16 have been locally deformed to the condition of FIG. 6, a second cutting tool, preferably a tap such as that represented at 36 in FIG. 8, is screwed into insert 16, which tap may be of conventional construction except as to the cross-section of its cutting teeth or elements 37, whose cutting edges 38, 39 and 40 may take the form illustrated in FIG. 7. With reference to FIG. 7, it is noted first of all that the major diameter cutting edges 39 of tap 36 are desirably of the same diameter as the major diameter portions 32 of threads 16, at the locations at which the threads have not been deformed. Also, the cutting edges 39 may have the same axial extent as the undeformed major diameter portions of the threads, and the corresponding major diameter portions of the external threads of the stud 30.

The minor diameter cutting edges 40 of tap 36 are of a diameter corresponding to the initial undeformed minor diameter portions 43 of threads 16, and therefore the corresponding minor diameter portions of the external threads of stud 30, to cut off the inwardly deformed peak portions 41 of threads 16′. Thus, the tap acts to cut away or relieve both the major and minor diameter portions of the deformed threads. To avoid simultaneous cutting away of the deformed areas radially between the major and minor diameter portions of the deformed threads, the two side cutting edges 38 of tap 36 extend at an angle less than 60° relative to one another, preferably at about 40° to one another, as shown. Thus, the portions 42 of the deformed threads are not cut away. It is further noted that the cross-section of the cutting portion of the tap is such that it can be screwed into and past the underformed portions of threads 16, without cutting those portions in any way.

After the tap 36 has been removed from the insert, and the insert has been installed to the FIG. 1 position, stud 30 may be screwed into threads 16, and will have a very effective self-locking action therewith. The nature of this self-locking action will be apparent from FIG. 7, in which the broken lines representing the initial undeformed condition of threads 16 may also be considered as representing the external shape of the threads of stud 30. It is noted that these threads of the stud will fit with relatively little deformation within the major diameter portions of the deformed threads of insert 12, and will similarly engage the minor diameter portions of threads 16 with less binding than would occur if those minor diameter portions 41 had not been cut off. The primary self-locking tight fitting action will be attained at the locations of surfaces 42 which have not been removed by the final tapping operation. In actual practice, inserts formed in this manner have proved effective to lock a stud in the insert very positively, and have been capable of doing this repeatedly without damage to the locking threads.

FIG. 9 shows a variational type of tap 36a which may be utilized in place of the tap 36 of FIG. 7. Tap 36a is identical with tap 36 except that edges 38a have radially outer portions 138a at a 60° angle to one another, rather than a 40° angle, to coincide exactly with the initial major diameter cross-section of insert threads 16a, so that a mating stud will not bind even slightly at this location. Radially inwardly of point 43' in FIG. 9, edges 38a are at 40° to one another. Thus, the surfaces of the deformed portions of the threads 16a have outer portions 44 at 60° to one another, then short 40° portions at 45, and inner portions 46 disposed at the initial 60° angle as altered by the deformation of the threads.

I claim:

1. The method comprising forming on an element a thread adapted to interfit with a coacting threaded member and having a major diameter portion and a minor diameter portion and a thread face radially therebetween, applying radial force to a localized area of said thread having a limited axial extent which is short as compared with the fuell axial length of the thread, thereby radially offsetting said major and minor diameter portions of said thread and said intermediate thread face at said localized area relative to corresponding portions of the thread at other locations and in a direction to interfit with said coacting member more tightly and thereby attain a self locking action, and subsequently removing material at said locally offset major and minor diameter portions to relieve the tightness of the thread interfit at those locations, while leaving said intermediate thread face less relieved to interfit more tightly than said major and minor diameter portions with said coacting member.

2. The method comprising forming on an element a thread adapted to interfit with a coacting threaded member and having a major diameter portion and a minor diameter portion and a thread face radially therebetween, applying radial force to a localized area of said thread having a limited axial extent which is short as compared with the full axial length of the thread, thereby radially offsetting said major and minor diameter portions of said thread and said intermediate thread face at said localized area relative to corresponding portions of the thread at other locations and in a direction to interfit with said coacting member more tightly and thereby attain a self locking action, and subsequently removing material at one of said locally offset major and minor diameter portions to relieve the tightness of the thread interfit at that location, while leaving said intermediate thread face less relieved to interfit more tightly with said coacting member.

3. The method comprising forming in the side wall of a generally tubular element an internal thread adapted to interfit with a coacting externally threaded member and having a major diameter portion and a minor diameter portion and a thread face radially therebetween, applying radially inward force to a localized area of said side wall having a limited axial extent which is short as compared with the full axial length of the thread, thereby locally deforming said wall radially inwardly and locally radially inwardly offsetting said major and minor diameter portions of said thread and said intermediate thread face at said localized area relative to corresponding portions of the thread at other locations, to interfit with said coacting member more tightly and thereby attain a self locking action, and subsequently removing material at only said locally offset major and minor diameter portions and not at said intermediate thread face to relieve the tightness of the thread interfit at said major and minor diameter locations while leaving said thread face unrelieved to interfit more tightly with said coacting member.

4. The method comprising forming in the side wall of a generally tubular element an internal thread adapted to interfit with a coacting externally threaded member and having a major diameter portion and a minor diameter portion and a thread face radially therebetween, applying radially inward force to a localized area of said side wall having a limited axial extent which is short as compared with the full axial length of the thread, thereby locally deforming said wall radially inwardly and locally radially inwardly offsetting said major and minor diameter portions of said thread and said intermediate thread face at said localized area relative to corresponding portions of the thread at other locations, to interfit with said coacting member more tightly and thereby attain a self locking action, and subsequently removing material at one of said offset major and minor diameter portions to relieve the tightness of the thread interfit at that location, while leaving said intermediate thread face less relieved to interfit more tightly with said coacting member.

5. The method comprising forming on an element a thread having major and minor diameter portions and having radially intermediate thread faces disposed at a first angle to one another by relatively rotating and axially advancing said element and a thread cutting tool having a cutting portion with opposite sides disposed at said first angle relative to the another, applying radial force to a localized area of said thread having a limited axial extent which is short as compared with the full axial length of the thread, thereby radially offsetting said major and minor diameter portions of said thread and said intermediate thread faces at said localized area relative to corresponding portions of the thread at other locations and in a direction to interfit more tightly in a self locking action with a coacting threaded member, then relatively rotating and axially advancing said element and a second thread cutting tool having a cutting portion with opposite sides disposed at a second angle relative to one another smaller than said first angle, and locally cutting away the material of said element at the location of said major diameter portion but not at said thread face by said second tool.

6. The method comprising forming on an element a thread having major and minor diameter portions and having radially intermediate thread faces disposed at a first angle to one another by relatively rotating and axially advancing said element and a thread cutting tool having a cutting portion with opposite sides disposed at said first angle relative to one another, applying radial force to a localized area of said thread having a limited axial extent which is short as compared with the full axial length of the thread, thereby radially offsetting said major and minor diameter portions of said thread and said intermediate thread faces at said localized area relative to corresponding portions of the thread at other locations and in a direction to interfit more tightly in a self locking action with a coacting threaded member, then relatively rotating and axially advancing said element and a second thread cutting tool having a cutting portion with opposite sides disposed at a second angle relative to one another smaller than said first angle, and locally cutting away the material of said element at the locations of both said offset major and minor diameter portions to relieve the tightness of the thread interfit at those locations, while leaving said intermediate thread faces unrelieved to interfit more tightly with said coacting member.

7. The method comprising forming on an element a thread having major and minor diameter portions and having radially intermediate thread faces disposed at a first angle to one another by relatively rotating and axially advancing said element and a thread cutting tool having a cutting portion with opposite sides disposed at said first angle relative to one another, applying radial force to a localized area of said thread having a limited axial extent which is short as compared with the full axial length of the thread, thereby radially offsetting said major and minor diameter portions of said thread and said intermediate thread faces at said localized area relative to corresponding portions of the thread at other locations and in a direction to interfit more tightly in a self locking action with a coacting threaded member, then relatively rotating and axially advancing said element and a second thread cutting tool having a cutting portion with opposite sides disposed partially at said first angle to one another and partially at a second and smaller angle, and locally cutting away the material of said element at the locations of both said offset major and minor diameter portions to relieve the tightness of the thread interfit at those locations, while leaving said intermediate thread faces unrelieved to interfit more tightly with said coacting member, said last step including cutting away said offset major diameter portion at said first angle.

References Cited in the file of this patent

UNITED STATES PATENTS

| | | |
|---|---|---|
| 1,475,561 | Bath | Nov. 27, 1923 |
| 2,314,780 | Gade | Mar. 23, 1943 |
| 2,581,690 | Moehle et al. | Jan. 8, 1952 |
| 2,754,871 | Stoll | July 17, 1956 |
| 2,796,107 | Schwaiger | June 18, 1957 |